US012780098B2

(12) United States Patent
Ma et al.

(10) Patent No.: US 12,780,098 B2
(45) Date of Patent: *Nov. 3, 2026

(54) TRAILER STRIKING AREA PREDICTION USING CAMERA MONITORING SYSTEM

(71) Applicant: STONERIDGE ELECTRONICS AB, Solna (SE)

(72) Inventors: Liang Ma, Rochester, MI (US); Troy Cooprider, White Lake, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 19/055,010

(22) Filed: Feb. 17, 2025

(65) Prior Publication Data

US 2025/0187545 A1 Jun. 12, 2025

Related U.S. Application Data

(63) Continuation of application No. 18/116,627, filed on Mar. 2, 2023, now Pat. No. 12,257,953.

(51) Int. Cl.
*B60R 1/26* (2022.01)
*B60R 1/25* (2022.01)

(52) U.S. Cl.
CPC .................. *B60R 1/26* (2022.01); *B60R 1/25* (2022.01); *B60R 2300/105* (2013.01); *B60R 2300/30* (2013.01); *B60R 2300/8086* (2013.01); *B60R 2300/8093* (2013.01)

(58) Field of Classification Search
CPC ....... B60R 1/26; B60R 1/25; B60R 2300/105; B60R 2300/30; B60R 2300/8086; B60R 2300/8093; G06V 20/58; G06V 20/59; G06V 20/588
See application file for complete search history.

(56) References Cited

U.S. PATENT DOCUMENTS

| | | | | |
|---|---|---|---|---|
| 2014/0309888 | A1* | 10/2014 | Smit | B60W 30/045 701/41 |
| 2017/0001566 | A1* | 1/2017 | Lu | B60R 1/26 |
| 2017/0050672 | A1* | 2/2017 | Gieseke | B60R 1/27 |
| 2019/0375399 | A1* | 12/2019 | Kasaiezadeh Mahabadi | B60W 30/12 |
| 2023/0406410 | A1* | 12/2023 | Sperrle | B62D 13/005 |

* cited by examiner

*Primary Examiner* — Nasim N Nirjhar
(74) *Attorney, Agent, or Firm* — Carlson, Gaskey & Olds, P.C.

(57) ABSTRACT

A camera monitoring system (CMS) for a vehicle, including a CMS controller including a memory and a processor, the CMS controller being connected to a plurality of cameras disposed about a vehicle and configured to receive a video feed from each of the cameras in the plurality of cameras, the CMS controller including at least one side camera configured to define a rear side view and at least one rear camera configured to generate a rear facing view, the memory storing a trailer end detection module configured to identify a trailer end within at least one image generated by the plurality of cameras, and the memory further storing a trailer striking area prediction module configured to define a striking area geometry using a set of predicted future positions of prediction points in a prediction set, the prediction points being defined along an edge of the trailer.

16 Claims, 6 Drawing Sheets

TRAILER STRIKING AREA PREDICTION USING CAMERA MONITORING SYSTEM

CROSS-REFERENCE TO RELATED APPLICATIONS

This application is a continuation of U.S. patent application Ser. No. 18/116,627 filed on Mar. 2, 2023, and is incorporated herein by reference.

TECHNICAL FIELD

This disclosure relates to a camera monitoring system (CMS) for use in a vehicle pulling a trailer, and in particular to a system for predicting a trailer striking area during a turning operation.

BACKGROUND

Mirror replacement systems, and camera systems for supplementing mirror views, are utilized in commercial vehicles to enhance the ability of a vehicle operator to see a surrounding environment. Camera monitoring systems (CMS) utilize one or more cameras disposed about the vehicle to provide an enhanced field of view to a vehicle operator. In some examples, mirror replacement systems within the CMS can cover a larger field of view than a conventional mirror, or can include views that are not fully obtainable via a conventional mirror.

Forward turning operations of tractor trailer configurations, such as a commercial shipping tractor trailer, require a wide turn in order to prevent the side of the trailer from inadvertently striking objects on the inside of the turn arc. Even when the inside portion of the turn is visible via mirrors and/or camera mirror systems, it can be difficult for less experienced operators to gauge the motion of the side of the trailer using only the conventional views.

Typically, vehicle operators compensate for the difficulty by using wider turns than are strictly necessary to ensure that objects on the inside of the turn are not struck by the trailer.

SUMMARY

In one exemplary embodiment a camera monitoring system (CMS) for a vehicle, includes a CMS controller including a memory and a processor, the CMS controller being connected to a plurality of cameras disposed about a vehicle and configured to receive a video feed from each of the cameras in the plurality of cameras, the CMS controller including at least one side camera configured to define a rear side view and at least one rear camera configured to generate a rear facing view, the memory storing a trailer end detection module configured to identify a trailer end within at least one image generated by the plurality of cameras, and the memory further storing a trailer striking area prediction module configured to define a striking area geometry using a set of predicted future positions of prediction points in a prediction set, the prediction points being defined along an edge of the trailer.

In another example of the above described CMS the striking area prediction module defines the striking area geometry by identifying a current location (t0) of a set of prediction points of the trailer along an inside edge of the trailer and store the current location (t0) of the set of prediction points in a prediction set, identifying a first predicted future position of each prediction point at a time t1 based on a set of parameters including at least a trailer angle of the vehicle, a steering angle of the vehicle and the current location (t0) of the corresponding prediction point and storing the first future prediction point (t1) in the prediction set, identifying at least one additional predicted future position of each prediction point at a time (tn) based on a second set of parameters including at least the trailer angle of the vehicle, the steering angle of the vehicle, and the location at a previous time (tn−1) of the corresponding prediction point, and converting each location in the prediction set from a three dimensional real world position to a two dimensional position within a rear view display image, generate a geometry including each two dimensional position, and causing the CMS to display the geometry over an image on the rear view display image as an overlay.

In another example of any of the above described CMSs the CMS is configured to iterate the process defined in the trailer striking area prediction module over the course of a turning operation.

In another example of any of the above described CMSs the memory further including a collision alert module configured to cause the controller to identify at least one object within an image, compare a location of the object within the image to the geometry, and output a collision warning in response to the object overlapping with the geometry.

In another example of any of the above described CMSs the set of parameters includes at least a trailer angle of the vehicle, a steering angle of the vehicle, the current location (t0) of the corresponding prediction point, rate of change of trailer angle, vehicle speed, and yawrate.

In another example of any of the above described CMSs the first predicted position of each prediction point at the time t1 and of each additional predicted future position is determined by applying the set of parameters to a kinematic model.

In another example of any of the above described CMSs the set of prediction points are evenly distributed along the side of the trailer.

In another example of any of the above described CMSs the set of prediction points are unevenly distributed along the side of the trailer.

In another example of any of the above described CMSs the set of prediction points are concentrated at or near the identified trailer end.

An exemplary method for displaying a potential striking area of a trailer to a vehicle operator, the method includes predicting a striking area of a trailer by defining a striking area geometry using a set of predicted future positions of prediction points in a prediction set, the prediction points being defined along an edge of a trailer, converting the geometry to a two dimensional overlay, and applying the two dimensional overlay to a rear view display during a turning operation.

In another example of the above described method for displaying a potential striking area of a trailer to a vehicle operator predicting a striking area of a trailer by defining a striking area geometry using a set of predicted future positions of prediction points in a prediction set comprises identifying a current location (t0) of a set of prediction points of the trailer along an inside edge of the trailer and store the current location (t0) of the set of prediction points in a prediction set, identifying a first predicted future position of each prediction point at a time t1 based on a set of parameters including at least a trailer angle of the vehicle, a steering angle of the vehicle and the current location (t0) of the corresponding prediction point and storing the first future prediction point (t1) in the prediction set, and identifying at least one additional predicted future position of each prediction point at a time (tn) based on a second set of parameters including at least the trailer angle of the vehicle, the steering angle of the vehicle, and the location at a previous time (tn−1) of the corresponding prediction point.

Another example of any of the above described methods for displaying a potential striking area of a trailer to a vehicle operator further includes iterating the process over the course of the turning operation.

In another example of any of the above described methods for displaying a potential striking area of a trailer to a vehicle operator the set of parameters includes at least a trailer angle of the vehicle, a steering angle of the vehicle, the current location (t0) of the corresponding prediction point, rate of change of trailer angle, vehicle speed, and yawrate.

In another example of any of the above described methods for displaying a potential striking area of a trailer to a vehicle operator the first predicted position of each prediction point at the time t1 and of each additional predicted future position is determined by applying the set of parameters to a kinematic model.

In another example of any of the above described methods for displaying a potential striking area of a trailer to a vehicle operator converting the geometry to a two dimensional overlay comprises converting each location in the prediction set from a three dimensional real world position to a two dimensional position within a rear view display image and generating a geometry including each two dimensional position, with the geometry defining the overlay.

Another example of any of the above described methods for displaying a potential striking area of a trailer to a vehicle operator further includes a controller identifying at least one object within an image, comparing a location of the object within the image to the geometry, and outputting a collision warning in response to the object overlapping with the geometry.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
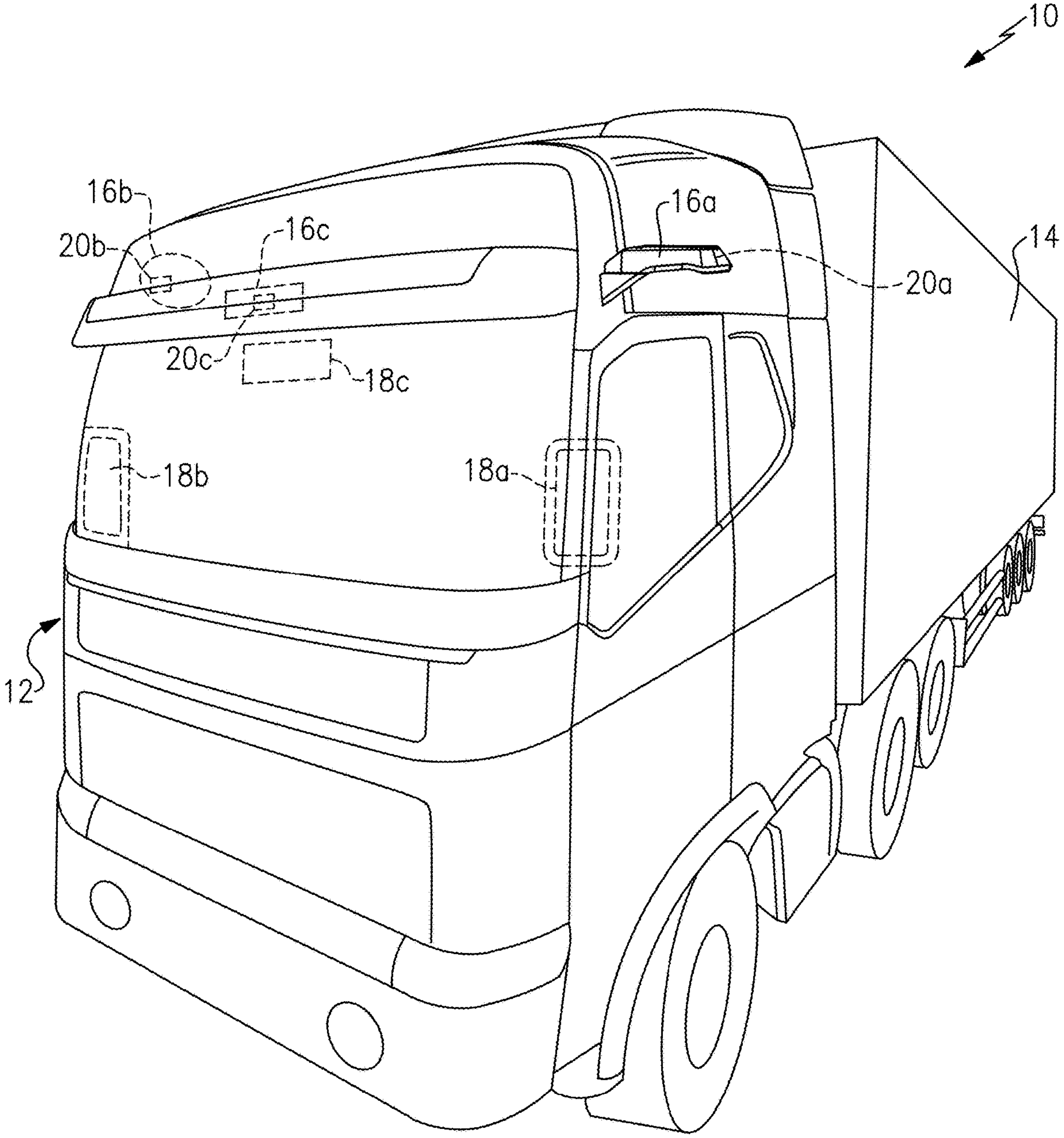
FIG. 1A is a schematic front view of a commercial truck with a camera monitoring system (CMS) used to provide at least Class II and Class IV views.
Figure 1B:
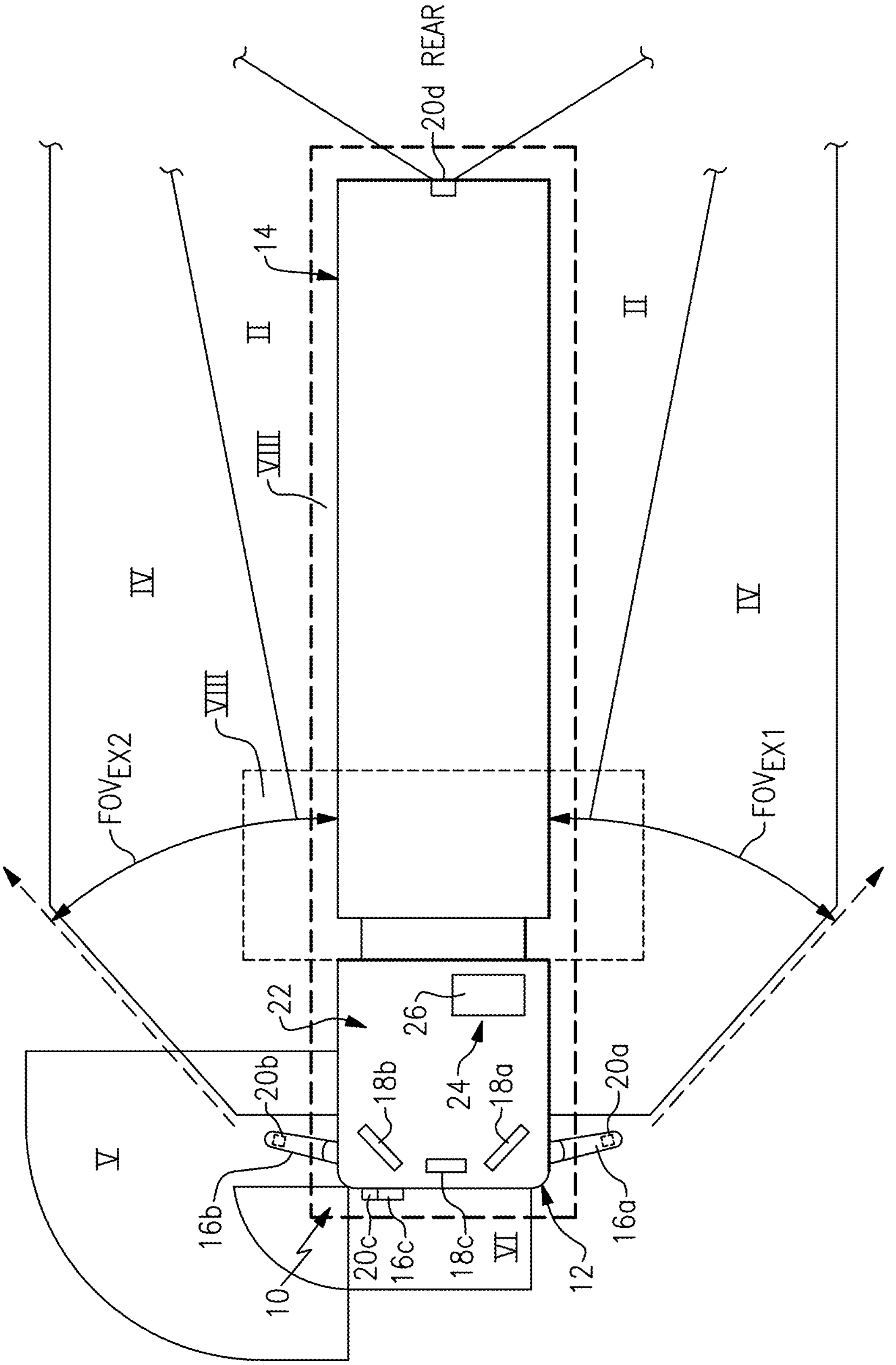
FIG. 1B is a schematic top elevational view of a commercial truck with a camera mirror system providing Class II, Class IV, Class V, Class VI and Class VIII views.
Figure 2:
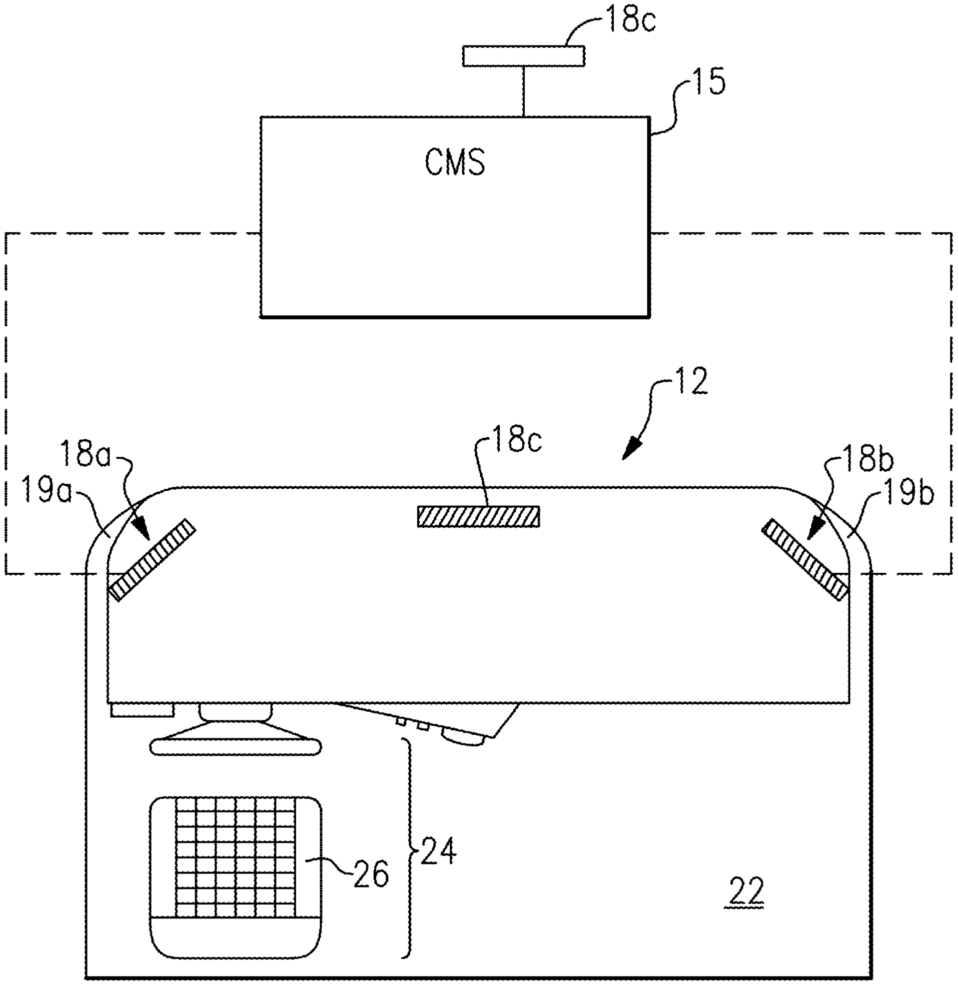
FIG. 2 is a schematic illustration of an interior of a vehicle cab.

A schematic view of a commercial vehicle 10 is illustrated in FIGS. 1A and 1B. FIG. 2 is a schematic top perspective view of the vehicle 10 cabin including displays and interior cameras. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms 16*a*, 16*b* mounted to the outside of the vehicle cab 12. If desired, the camera arms 16*a*, 16*b* may include conventional mirrors integrated with them as well, although the CMS 15 can be used to entirely replace mirrors. In additional examples, each side can include multiple camera arms, each arm housing one or more cameras and/or mirrors.

Each of the camera arms 16*a*, 16*b* includes a base that is secured to, for example, the cab 12. A pivoting arm is supported by the base and may articulate relative thereto. At least one rearward facing camera 20*a*, 20*b* is arranged respectively within camera arms. The exterior cameras 20*a*, 20*b* respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16*a*, 16*b* to provide these views, if desired. Class II and Class IV views are defined in European R46 legislation, for example, and the United States and other countries have similar drive visibility requirements for commercial trucks. Any reference to a “Class” view is not intended to be limiting, but is intended as exemplary for the type of view provided to a display by a particular camera. Each arm 16*a*, 16*b* may also provide a housing that encloses electronics that are configured to provide various features of the CMS 15.

First and second video displays 18*a*, 18*b* are arranged on each of the driver and passenger sides within the vehicle cab 12 on or near the A-pillars 19*a*, 19*b* to display Class II and Class IV views on its respective side of the vehicle 10, which provide rear facing side views along the vehicle 10 that are captured by the exterior cameras 20*a*, 20*b*.

If video of Class V and/or Class VI views are also desired, a camera housing 16*c* and camera 20*c* may be arranged at or near the front of the vehicle 10 to provide those views (FIG. 1B). A third display 18*c* arranged within the cab 12 near the top center of the windshield can be used to display the Class V and Class VI views, which are toward the front of the vehicle 10, to the driver. The displays 18*a*, 18*b*, 18*c* face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the Class VIII zones of the vehicle 10. As illustrated, the Class VIII view includes views immediately surrounding the trailer, and in the rear proximity of the vehicle including the rear of the trailer. In one example, a view of the rear proximity of the vehicle is generated by a rear facing camera disposed at the rear of the vehicle, and can include both the immediate rear proximity and a traditional rear view (e.g. a view extending rearward to the horizon, as may be generated by a rear view mirror in vehicles without a trailer). In such examples, the third display 18*c* can include one or more frames displaying the Class VIII views. Alternatively, additional displays can be added near the first, second and third displays 18a, 18b, 18c and provide a display dedicated to providing a Class VIII view.

In some cases, the Class VIII view is generated using a trailer mounted camera 30. The trailer mounted camera 30 is a rear facing camera which provides a field of view 32 that encompasses a portion of the trailer, the rear facing Class VIII view and a conventional rear view mirror. This rear view mirror portion can be identified by the CMS 15 and provided to one of the displays 18a, 18b and/or another display 18c within the vehicle cabin 22 as a rear view mirror replacement or as a rear view mirror supplement. This view is particularly beneficial as the trailer 14 may block some, or all, views provided by a conventional rear view mirror.

The CMS 15 is also configured to utilize the images from the cameras 20a, 20b, 30 as well as images from other cameras that may be disposed about the vehicle or in communication with the vehicle to determine features of the vehicle, identify objects, and facilitate driver assistance features such as display overlays and semi-automated driver assistance systems.

These features and functions of the CMS 15 are used to implement multiple CMS 15 systems that aid in operation of the vehicle.

In one example operation, the CMS 15 includes a trailer striking area prediction system 40 that predicts a striking zone of the trailer 14 during a turn operation and generates a two dimensional overlay to digitally impose over Class II/IV images thereby showing the vehicle operator an expected striking zone of the trailer 14 and allowing the vehicle operator adjust the vehicle operations accordingly. The CMS 15 uses the received images from the cameras 20a, 20b, as well as any other cameras and vehicle operation data received from a general vehicle controller through a data connection, such as a CAN bus, to estimate a predicted position of the trailer side at each of multiple side positions and multiple points in time. These positions are converted to a geometric area encompassing all the positions. In this way, the shape and size of the geometric area is not fixed, but rather reflects an actual predicted striking area of the trailer.

Figure 3A:
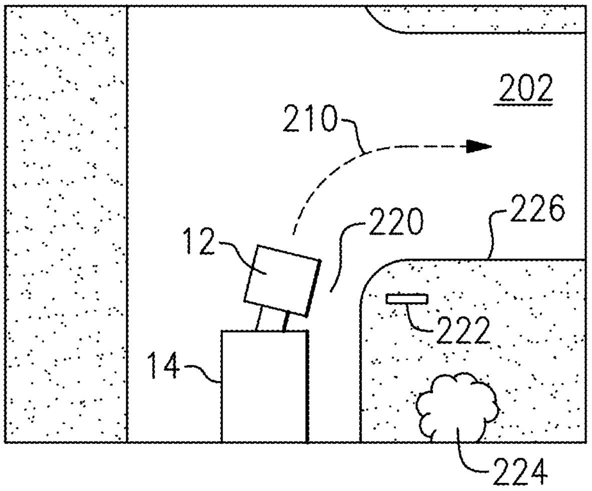
FIGS. 3A-3B schematically illustrate a commercial truck turning operation at a start (FIG. 3A), a middle (FIG. 3B) and end (FIG. 3C) of a forward moving turning operation.
Figure 3B:
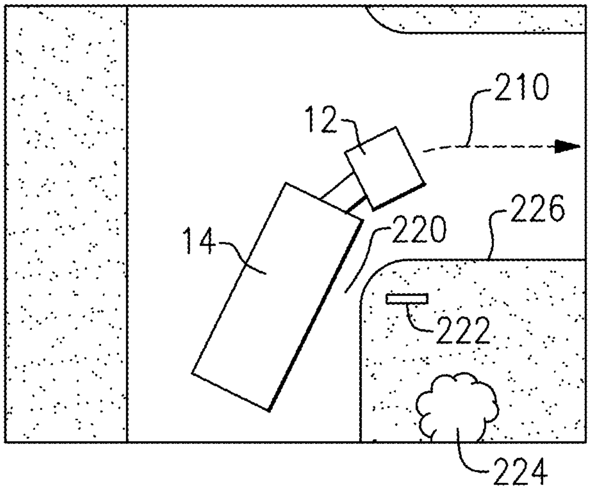
Figure 3C:
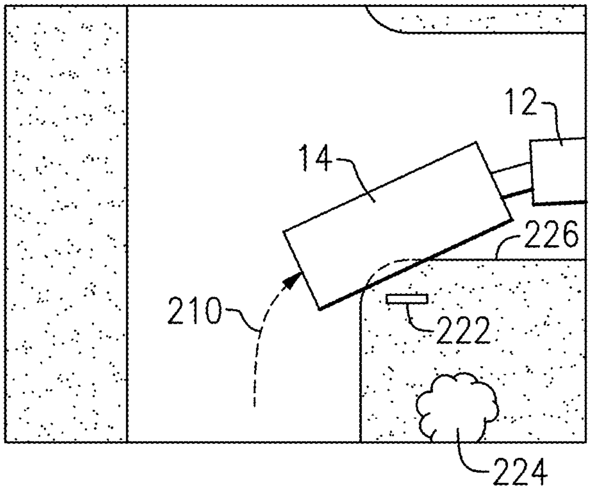

With continued reference to FIGS. 1-2B, FIGS. 3A, 3B, and 3C provide a scene 200 illustrating an example forward moving turn operation of a tractor 12 towing a trailer 14, with FIG. 3A illustrating a start of the turn, FIG. 3B illustrating the middle of the turn, and FIG. 3C illustrating the end of the turn. The schematic tractor 12 and trailer 14 are schematic representations of the tractor 12 and trailer 14 illustrated in FIGS. 1, 2A and 2B, however, the system and process for estimating the trailer striking area described herein can be incorporated in any similar tractor trailer configuration including a CMS 15 and the disclosure is not limited to the specific example environment.

In the illustrated turn sequence, the tractor 12 pulls the trailer 14 around a right turn in a road 202. The turn travels along a turn path 210, with the path 210 being directly controlled by the steering angle of the tractor 12. As the vehicle 10 (including the tractor 12 and the trailer 14) travels along the turn path 210, the trailer 14, and particularly an inside side 14' of the trailer 14 cuts toward the inside of the turn, with the trailer 14 crossing over portions of the road, and the adjacent ground 220 that the tractor 12 did not pass over. The portions of the area inside the turn that the trailer 14 passes through are referred to as the "striking area", as objects positioned in the striking area will be struck by the side 14' of the trailer 14 if they are tall enough, and are prone to be struck by tires, or pass under the trailer 14 if they are not tall enough to be struck by the side 14'.

Figure 4:
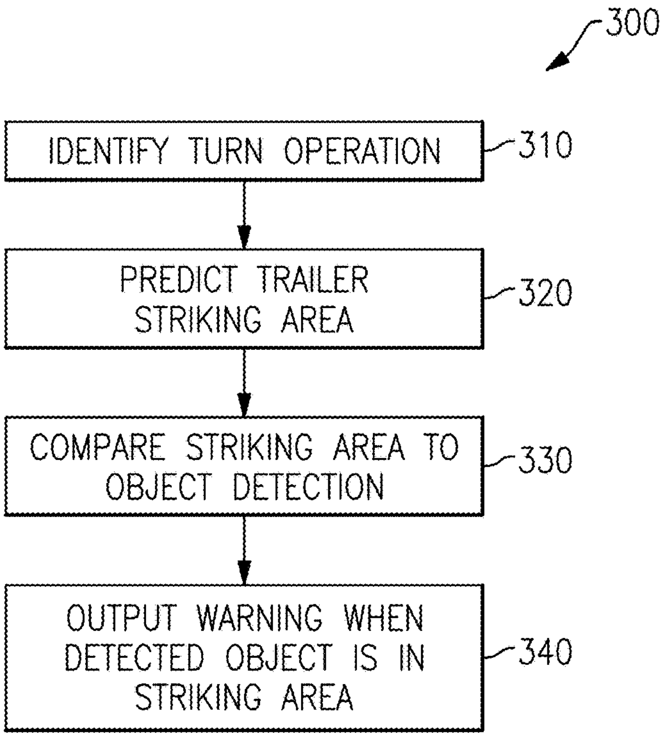
FIG. 4 illustrates a method for providing trailer striking area collision warnings using the CMS.

In order to avoid accidental strikes, the striking area prediction system uses the vehicle data (e.g. steering angle, steering rate, vehicle speed, yaw rate and the like) to generate a predicted striking zone over time using a process 300 illustrated in FIG. 4. The predicted striking zone is a prediction of the path the trailer will take over the course of the turn and is re-calculated continuously as the turn progresses.

The process initially identifies that a turning operation is occurring in an "Identify Turn Operation" step 310. The turn operation can be automatically identified by detecting a steering angle change, a geospatially detected vehicle route direction change, a combination of the two, or a manual turn start input from the vehicle operator.

Once the turn is identified, the trailer striking area prediction system 40 determines an expected striking area in a "Predict Trailer Striking Area" step 320. The striking area prediction is the zone extending away from the side of the trailer 14 that the trailer 14 will pass through as the vehicle 10 completes the turn. In some examples, the prediction is based on a snapshot of the current steering angle speed and other vehicle parameters. In other examples, a change in steering angle over time is used rather than an instantaneous steering angle. Similarly, in other examples, one or more additional vehicle parameters may be overtime values rather than instantaneous snapshots. In another example, known, knowable, or detectable external factors (e.g., road conditions, road grade, weather conditions, and the like) are further incorporated into the prediction process.

In addition to predicting the striking area, the process 300 either identifies objects (e.g., sign 222, tree 224, and curb 226) within received images or another system within the CMS 15 in communication with the trailer striking area prediction system 40 provides object identifications to the trailer striking area prediction system 40. After receiving the object identifications, the process 300 compares the location of the identified objects 222, 224, 226 with the estimated striking area in a "Compare Striking Area to Object Detection" step 330. When the object 222, 224, 226 intersects with the estimated striking area, the process 300 outputs a warning to the vehicle operator in an "Output Warning When Detected Object is in Striking Area" step 340. The warning can either be an audio output and/or visual output that alerts the vehicle operator of a potential collision. As the process is predictive in nature, the alert allows the vehicle operator to adjust the turn operation to avoid the expected collision, and the system automatically updates the predicted striking zone to compensate for the correction.

Figure 5:
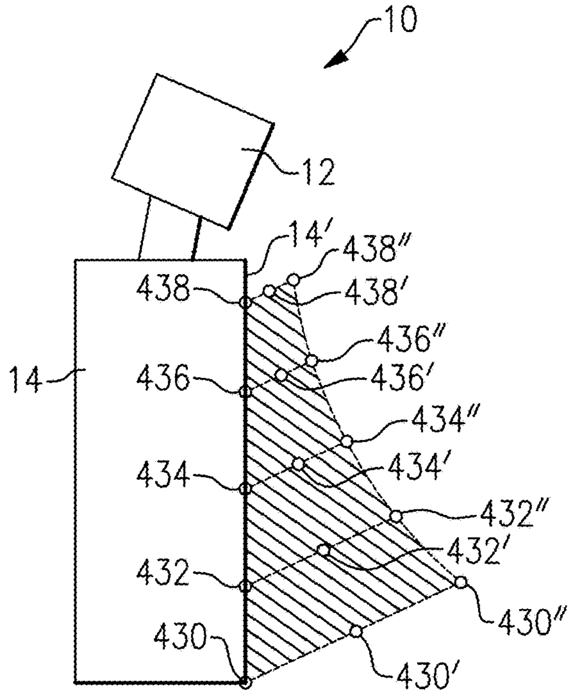
FIG. 5 illustrates a predicted striking area of a trailer.
Figure 6:
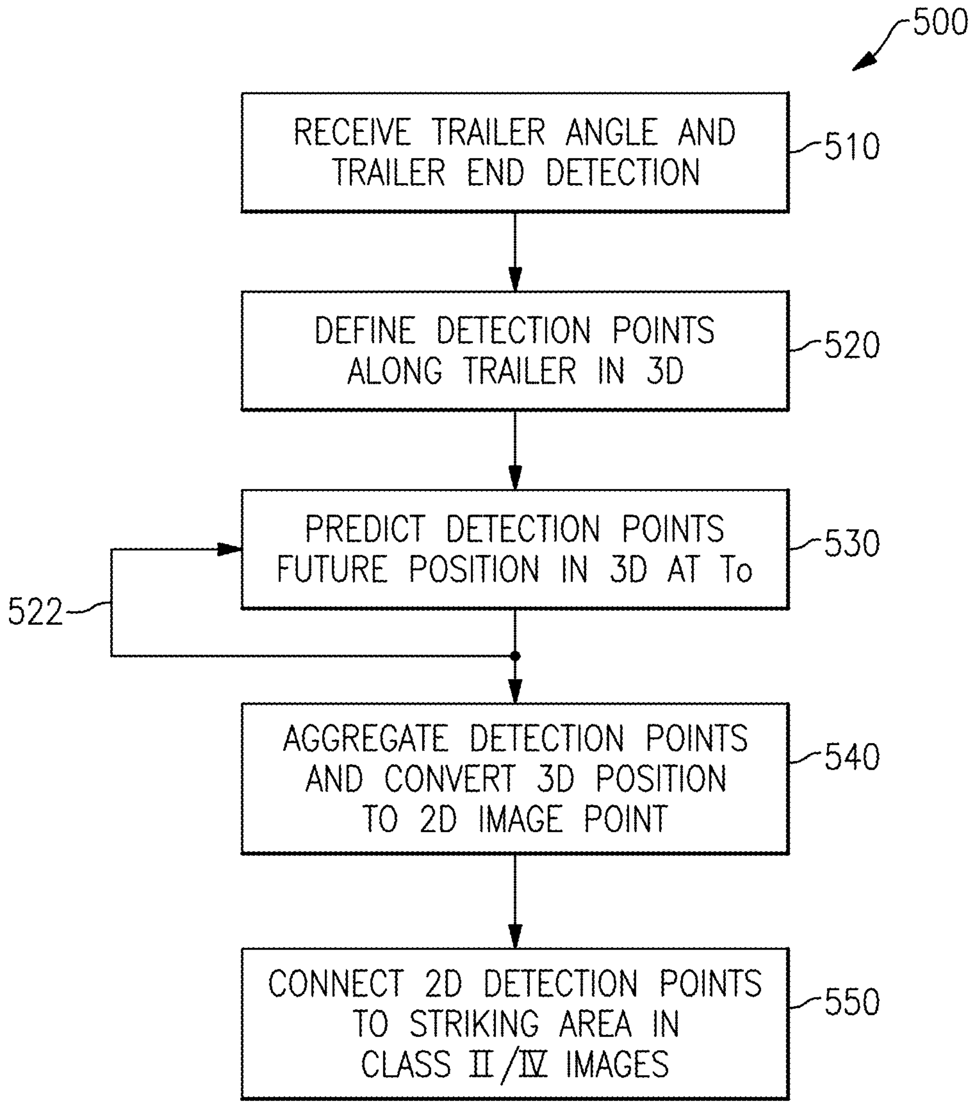
FIG. 6 illustrates a detailed method for generating the trailer striking area of FIG. 5 and using the same to generate an overlay.

With continued reference to the overall process of FIG. 4, FIGS. 5 and 6 illustrate the detailed process for generating the estimated striking zone 410. As described above, initially the prediction system 40 receives the trailer angle and trailer end detection in a "Receive Trailer Angle and Trailer End Detection" step 510. The trailer angle and end detection can be performed using any conventional detection including image based detections, sensor based detections, and/or any other existing detection system(s).

The trailer angle and trailer end information are then used by the CMS controller to identify multiple detection points along the inside edge 14' of the trailer 14 in a "Define Detection Points Along Trailer in 3D" step 520. As used herein, "3D" refers to positioning in three dimensional real space relative to the trailer and "2D" refers to a position on an image frame along a two dimensional (E.G., X-Y) axis. Existing systems, and particularly systems within vehicle camera monitoring arts can utilize any number of established processes or methodologies to convert a 3D position to a 2D position of a given camera view.

The multiple detection points 430-438 are distributed along the side 14' of the trailer 14 inside the turn. In the illustrated example, the detection points 430-438 are evenly distributed along the side 14'. In alternate examples, an even distribution may not be required and the detection points 430-438 can be concentrated near the endpoint (trailer endpoint 430) with the detection points near the tractor end being spread farther apart. In one example a fixed number (e.g., five) of detection points are used and the points are distributed across the side 14'. In another example, the number of detection points 430-438 is determined based on the length of the trailer and a desired distribution of the detection points.

After defining the initial detection points 430-438 along the side of the trailer 14, the striking area prediction system 40 applies the steering angle, trailer angle, rate of change of trailer angle, vehicle speed, yawrate, and/or any similar parameters known by the CMS 15 to a kinematic model to predict a three dimensional position of each detection point at a future time (t1) a predetermined duration in the future (e.g. 1 second) in a "Predict Detection Points Future Position in 3D" step 530. Each predicted point at t1 is stored, and the step 520 is reiterated 522 using the t1 position of the detection point 430'-438' as the starting point, and generating a new predicted position of the detection point 430"-438" at t2. In the illustrated example of FIGS. 5 and 6, the prediction is iterated twice generating two predicted future positions (t1, t2). It is appreciated that in alternative examples, the number of iterations can be increased when a longer duration prediction is required. Similarly, the number of iterations can be increased with a shorter duration between prediction points (e.g., t0 to t1, t1 to t2 etc.) resulting in a greater number of prediction points generating the geometry of the predicted striking area.

After iterating 522, the process aggregates the detection points 430-438 and converts the 3D positions of the prediction points into two dimensional positions within an image plane of a Class II/IV image to which the overlay is being applied in a 'Aggregate Detection Points and Convert 3D Position to 2D Image Point" step 540. After converting the image points to two dimensional image points, the aggregated image points are converted into a striking area 410 by defining a bound in the 2D space including all predicted positions 430-438 from t0 through tn in a "Convert 2D Detection Points to Striking Area in Class II/IV images" step 550. The bound is defined as the minimum space required to include all predicted positions 430-438. The striking area 410 is then aligned with the side of the truck in the Class II/IV images and shaded as an overlay.

The overlay is continuously updated, as the process is iterated, thereby allowing the striking area overlay to be accurate throughout the vehicle turn.\

While described above in relation to a commercial tractor pulling a trailer, it is appreciated that the wide turn requirement is present in any similar vehicle. As such, the features, systems and apparatuses of the invention described herein are applicable to any similar vehicle configurations and are not limited to commercial tractor trailer configurations.

Although an example embodiment has been disclosed, a worker of ordinary skill in this art would recognize that certain modifications would come within the scope of the claims. For that reason, the following claims should be studied to determine their true scope and content.

What is claimed is:

1. A camera monitoring system (CMS) for a vehicle, comprising:

a CMS controller including a memory and a processor;

the CMS controller being connected to a plurality of cameras disposed about a vehicle and configured to receive a video feed from each of the cameras in the plurality of cameras, the CMS controller including at least one side camera configured to define a rear side view and at least one rear camera configured to generate a rear facing view;

the memory storing a trailer end detection module configured to identify a trailer end of a trailer within at least one image generated by the plurality of cameras; and the memory further storing a trailer striking area prediction module configured to define a striking area geometry using a set of predicted future positions of prediction points in a set of prediction points, wherein the set of prediction points are concentrated at or near the identified trailer end, the set of prediction points are defined along a side of the trailer, the predicted future positions in the set of prediction points are aggregated and converted to the trailer striking area.

2. The CMS of claim 1, wherein the set of prediction points are evenly distributed along the side of the trailer.

3. The CMS of claim 1, wherein the set of prediction points are unevenly distributed along the side of the trailer.

4. The CMS of claim 1, wherein the set of prediction points form a boundary of the trailer striking area.

5. The CMS of claim 4, wherein the boundary includes a portion with a non-linear contour corresponding to a trailer trajectory.

6. The CMS of claim 5, wherein the trailer trajectory corresponds to a trailer path of the side of the trailer.

7. The CMS of claim 1, comprising a display in communication with the controller, wherein the controller is configured to cause the trailer striking area to be illustrated on the display.

8. A method for displaying a potential striking area of a trailer to a vehicle operator, the method comprising:

defining a trailer striking area geometry using a set of predicted future positions of prediction points in a set of prediction points, the set of prediction points are defined along a side of the trailer, wherein the set of prediction points are concentrated at or near an identified trailer end of the trailer;

aggregating the predicted future positions in the set of prediction points;

converting the aggregated predicted future positions to the trailer striking area to provide a two dimensional overlay; and applying the two dimensional overlay to display during a turning operation.

9. The method of claim 8, wherein converting the geometry to a two dimensional overlay comprises converting each location in the set of prediction points from a three dimensional real world position to a two dimensional position within a rear view display image and generating a geometry including each two dimensional position, with the geometry defining the overlay.

10. The method of claim 8, further comprising a controller identifying at least one object within an image, comparing a location of the object within the image to the geometry, and outputting a collision warning in response to the object overlapping with the geometry.

11. The method of claim 8, wherein the set of prediction points are evenly distributed along the side of the trailer.

12. The method of claim 8, wherein the set of prediction points are unevenly distributed along the side of the trailer.

13. The method of claim 8, wherein the set of prediction points form a boundary of the trailer striking area.

14. The method of claim 13, wherein the boundary includes a portion with a non-linear contour corresponding to a trailer trajectory.

15. The method of claim 14, wherein the trailer trajectory corresponds to a trailer path of the side of the trailer.

16. A camera monitoring system (CMS) for a vehicle, comprising:

a CMS controller including a memory and a processor;

the CMS controller being connected to a plurality of cameras disposed about a vehicle and configured to receive a video feed from each of the cameras in the plurality of cameras, the CMS controller including at least one side camera configured to define a rear side view and at least one rear camera configured to generate a rear facing view;

the memory storing a trailer end detection module configured to identify a trailer end of a trailer within at least one image generated by the plurality of cameras; and the memory further storing a trailer striking area prediction module configured to define a striking area geometry using a set of predicted future positions of prediction points in a set of prediction points, the set of prediction points are defined along a side of the trailer, the predicted future positions in the set of prediction points are aggregated and converted to the trailer striking area.

* * * * *